United States Patent
Kamper et al.

(10) Patent No.: US 9,943,086 B2
(45) Date of Patent: Apr. 17, 2018

(54) AERATED CONFECTIONS CONTAINING NONHYDRATED STARCH AND METHODS OF PREPARATION

(75) Inventors: Susan L. Kamper, Waconia, MN (US); Fern A. Panda, White Bear Lake, MN (US); Daniel R. Green, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 2034 days.

(21) Appl. No.: 12/212,149

(22) Filed: Sep. 17, 2008

(65) Prior Publication Data

US 2009/0081349 A1 Mar. 26, 2009

Related U.S. Application Data

(60) Provisional application No. 60/973,227, filed on Sep. 18, 2007, provisional application No. 60/013,454, filed on Dec. 13, 2007.

(51) Int. Cl.
| | |
|---|---|
| A23G 3/34 | (2006.01) |
| A23G 3/36 | (2006.01) |
| A23G 3/52 | (2006.01) |
| A23G 3/42 | (2006.01) |
| A23G 3/02 | (2006.01) |
| A23G 3/44 | (2006.01) |

(52) U.S. Cl.
CPC ............ *A23G 3/52* (2013.01); *A23G 3/42* (2013.01); *A23G 3/0221* (2013.01); *A23G 3/362* (2013.01); *A23G 3/44* (2013.01)

(58) Field of Classification Search
USPC ....... 426/564, 571, 572, 658, 659, 660, 661, 426/74
See application file for complete search history.

(56) References Cited

U.S. PATENT DOCUMENTS

| | | | |
|---|---|---|---|
| 2,600,569 A | 6/1952 | Oakes | |
| 3,608,061 A | 9/1971 | McNally | |
| 3,767,830 A | 10/1973 | Reimer | |

(Continued)

FOREIGN PATENT DOCUMENTS

| | | |
|---|---|---|
| CA | 911804 | 10/1972 |
| DE | 3420026 A1 | 12/1985 |

(Continued)

OTHER PUBLICATIONS

Ken Klacik, Jun. 1993, Syrup Cooking, 59-72.

*Primary Examiner* — Erik Kashnikow
*Assistant Examiner* — Lela S. Williams
(74) *Attorney, Agent, or Firm* — Gregory P. Kaihoi, Esq.; Diederiks & Whitelaw, PLC

(57) ABSTRACT

Disclosed are sugar reduced aerated confections. The confections essentially comprise a first heterogeneous continuous phase including a structured amorphous saccharide, a second discontinuous phase including a multiplicity of gas cells. The first heterogeneous continuous phase includes a multiplicity of crystals distributed evenly throughout also including about 1%-35% by dry weight basis of a nonhydrated polysaccharide filler ingredient preferably starch in the form of discrete particles evenly distributed through the continuous phase having a mean particle size distribution of preferably less than 150 microns. The confectionery food products find particular suitability for use as ingredients for reduced sugar children's RTE cereals.

14 Claims, 2 Drawing Sheets

(56) References Cited

U.S. PATENT DOCUMENTS

| | | |
|---|---|---|
| 4,120,987 A | 10/1978 | Moore |
| 4,145,448 A | 3/1979 | Hayward et al. |
| 4,152,462 A | 5/1979 | Hayward et al. |
| 4,152,463 A | 5/1979 | Hayward et al. |
| 4,189,502 A | 2/1980 | Rubenstein |
| 4,230,053 A | 10/1980 | Deardorff et al. |
| 4,232,049 A | 11/1980 | Blake |
| 4,323,588 A | 4/1982 | Vink et al. |
| 4,785,551 A | 11/1988 | Meyer |
| 4,925,380 A | 5/1990 | Meisner |
| 5,019,404 A | 5/1991 | Meisner |
| 5,429,830 A | 7/1995 | Janovsky et al. |
| 5,462,760 A | 10/1995 | Serpeloni et al. |
| D376,039 S | 12/1996 | Pike |
| 6,197,355 B1 | 3/2001 | Zietlow et al. |
| 6,207,216 B1 | 3/2001 | Zietlow et al. |
| 6,251,203 B1 | 6/2001 | Vala et al. |
| 6,309,686 B1 | 10/2001 | Zietlow et al. |
| 6,432,460 B1 | 8/2002 | Zietlow et al. |
| 6,436,455 B2 | 8/2002 | Zietlow et al. |
| 6,793,953 B2 | 9/2004 | Zietlow et al. |
| 2002/0001666 A1 | 1/2002 | Klein |
| 2002/0110634 A1 | 8/2002 | Zietlow et al. |
| 2003/0049357 A1 | 3/2003 | Phipps |
| 2004/0131743 A1 | 7/2004 | Ajao et al. |
| 2004/0197441 A1 | 10/2004 | Teoh |
| 2004/0247761 A1 | 12/2004 | Zietlow et al. |
| 2005/0013923 A1 | 1/2005 | Shimek et al. |
| 2006/0008569 A1 | 1/2006 | Broz et al. |
| 2006/0280834 A1 | 12/2006 | Jani et al. |
| 2007/0026129 A1 | 2/2007 | Pandey et al. |
| 2007/0053978 A1 | 3/2007 | Sherwood et al. |
| 2007/0082104 A1 | 4/2007 | De Baets |

FOREIGN PATENT DOCUMENTS

| | | |
|---|---|---|
| EP | 55830 B1 | 11/1981 |
| GB | 2115673 A | 3/1982 |
| KR | 198701328 | 4/1986 |
| MX | 2001JL000024 A | 5/2003 |
| WO | WO 1999/063836 A1 | 12/1999 |
| WO | WO 2000/053024 A1 | 9/2000 |
| WO | WO 2000/064270 A1 | 11/2000 |
| WO | WO 2001/010236 A1 | 2/2001 |
| WO | WO 2001/028350 A1 | 4/2001 |
| WO | WO 2002/071872 A2 | 9/2002 |
| WO | WO 2004/037013 A2 | 5/2004 |
| WO | WO 2004/077964 A1 | 9/2004 |
| WO | WO 2004/093558 A2 | 11/2004 |
| WO | WO 2005/089255 A2 | 9/2005 |
| WO | WO 2006/127481 A2 | 11/2006 |
| WO | WO 2006/127599 A2 | 11/2006 |

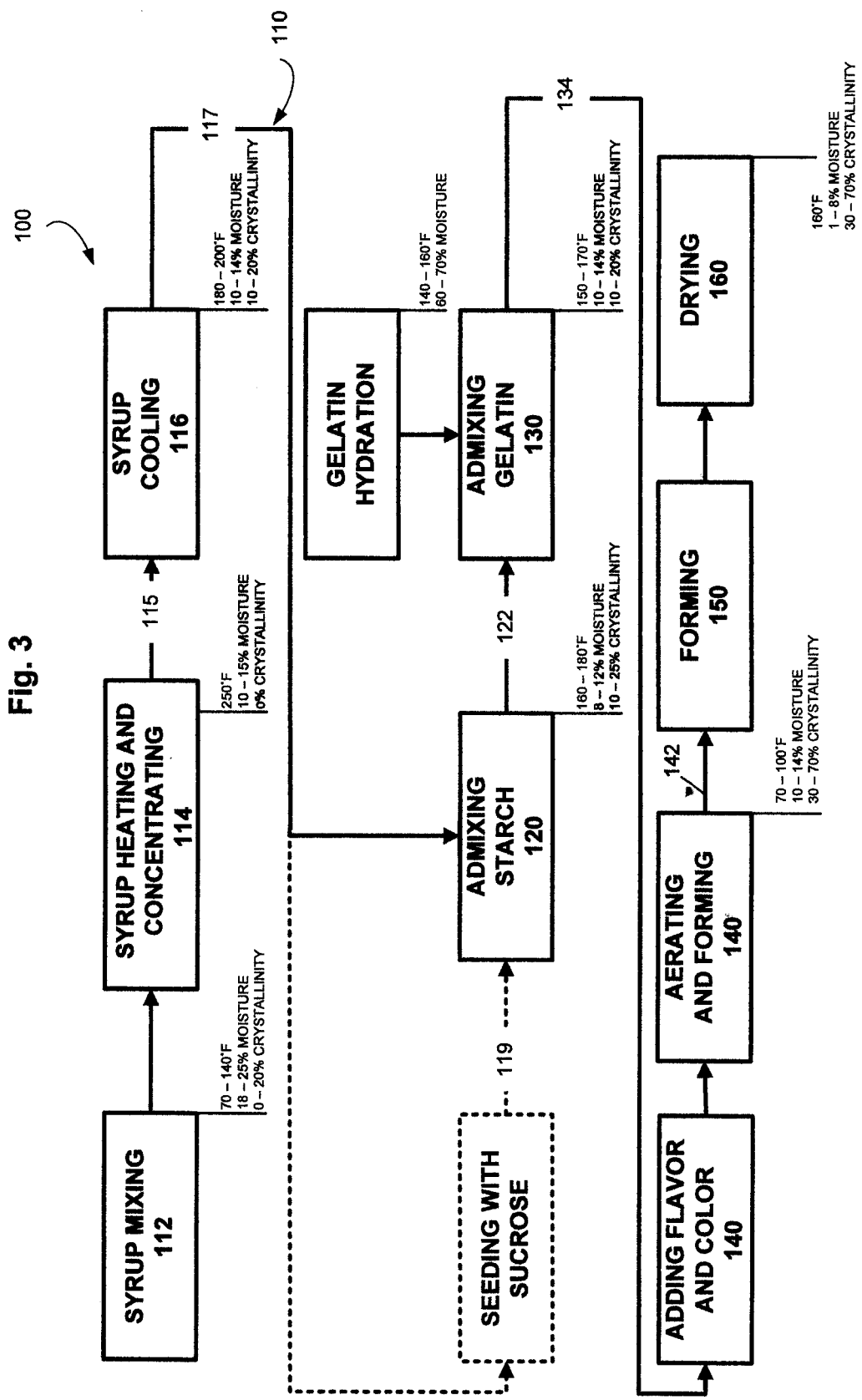

AERATED CONFECTIONS CONTAINING NONHYDRATED STARCH AND METHODS OF PREPARATION

CROSS-REFERENCE TO RELATED APPLICATIONS

This application claims the benefit of priority under 35 U.S.C. 119(e)(1) of provisional patent application Ser. No. 60/973,227, filed Sep. 18, 2007, and Ser. No. 60/013,454, filed Dec. 13, 2007 which are incorporated herein by reference in its entity.

FIELD OF THE INVENTION

The present invention is directed generally to food products and to their methods of preparation. In particular, the present invention is directed to improved aerated confectionery products such as sugar reduced dried marshmallows containing nonhydrated starch and to processes for making.

BACKGROUND OF THE INVENTION

Aerated confectionery products are popular food items. Some products are fabricated from aerated confection compositions that comprise a fat constituent while others are substantially free of such fat constituents. An illustrative fat free aerated confection is the common marshmallow. Such marshmallow products are familiar in both larger and smaller sizes.

It is well known that such marshmallows when fresh are soft and pliable but will stale by losing moisture and become harder. Indeed, purposefully pre-dried aerated confections are also well known. These products, particularly in smaller or bite sizes, are commonly added to certain popular Ready-To-Eat ("RTE") breakfast cereals, particularly those marketed to children. Due to their small size (i.e., having a number count of about 3 to 6/g.), these dried aerated confectionery marshmallow products are sometimes colloquially referred to as "Marshmallow bits" or "marbits". The marbits must be pre-dried prior to admixture with the RTE cereal in order to reduce unwanted moisture migration from the marbit to the cereal and thus to forestall the multiple problems resulting therefrom. These dried marshmallow pieces exhibit desirable crisp, frangible eating qualities. Generally, marbits are desirably a grained confection. Thus, such dried confections are crunchy rather than tough or chewy.

While there are many types of marshmallow products on the market, their methods of preparation generally fall into two main process groups: extruded marshmallow and deposited marshmallow. In both types, a sugar syrup, a structuring agent, and a whipping agent are the main ingredients. Often, gelatin is used as both the whipping agent to form an aerated foam as well as the structuring agent for setting the foam. Typically, the sugar syrup heated to dissolve solids and then boiled to reduce moisture and is thereafter cooled, and then combined with the gelatin solution to form a slurry. That slurry is then aerated to form a foam. Optionally, colors and flavors are added to the foam immediately after aeration although in certain embodiments these adjuvants are added to the syrup prior to aerating. The particular marshmallow product may be formed into its final shape by an extrusion process. That is, after aeration, the foam is extruded through a die to form a rope. The die imparts the desired peripheral shape to the extrudate rope. The rope is allowed to rest briefly to set, and it maybe dusted or enrobed with starch before being cut into desired sizes. For dried marshmallows, the process can additionally include one or more drying steps. (See, for example U.S. Pat. No. 4,785,551 issued 2 Nov. 1988 to W. J. Meyer entitled "Method of Drying Confection Pieces" which is incorporated herein by reference).

While marshmallows of a single color are most common, marshmallows having two or even a plurality of colors (collectively herein, "multi-colored") are also known (see, for example, D 376,039 issued Dec. 3, 1996 entitled "Food Product", showing a two color marbit design) as well as methods for their preparation. (See, for example, U.S. Pat. No. 4,925,380 issued Oct. 20, 1986 entitled "Multicolor Confection Extrusion System and U.S. Pat. No. 5,019,404 issued Feb. 28, 1990 entitled "Multicolor Confection Extrusion System"). Both the '404 and '380 patent each well describe the difficulties and sensitivities of such foam product preparation. The conventional processes for making multi-colored marshmallows teach to divide the aerated foam into a plurality of sub-streams, to admix a desired colorant to each sub-stream, and then extrude these colored sub-streams in substantially equal portions into a single rope or multiplicity of such ropes. Alternatively, a cooked sugar syrup or slurry is divided into individual portions or substreams to each of which are added distinctive colors and/or flavors that are individually aerated. The separate foam sub-streams or portions are then recombined to fabricate more complex product designs.

Similarly, marshmallows composed of a single formulation are most common, however marshmallows composed of two or more formulations are also known (see, for example U.S. Pat. No. 6,207,216 issued Mar. 27, 2001 entitled "Quickly Dissolving Aerated Confection and Method of Preparation"). The use of novel protein containing marshmallow formulations capable of dissolving at different rates upon contact with liquid is well described in '216. The use of novel non-protein containing marshmallow formulations also capable of dissolving at different rates upon contact with liquid are described herein. Marshmallows containing such formulations change their appearance upon exposure to liquid when the faster dissolving portion dissolves, leaving behind the slower dissolving portion and its residual shape.

Since marshmallow pieces are so drastically different in their formulation and method of making from the cereal pieces they often accompany in commercially marketed cereal products, they can be used as a vehicle to carry nutritional supplements or other beneficial ingredients not easily incorporated into cereal pieces. Such nutritional components include biologically active components, fiber, micro-nutrients, minerals and mixtures thereof. Marshmallow bits can also serve as carriers of useful drugs and pharmacological agents. Such nutritionally fortified marshmallow pieces are also known (see, for example U.S. Pat. No. 6,432,460 issued Aug. 13, 2002 entitled "Food Product and Method of Preparation", and U.S. Pat. No. 6,793,953 issued Sep. 21, 2004 entitled "Food Product and Method of Preparation"). Marshmallows described in '460 produced by the process described in '953 can contain calcium, an important mineral for bone health, at fortifying levels without significantly altering the taste as compared to an unfortified marshmallow.

As previously described marbits can be admixed with loose ready-to-eat cereal pieces, such cereal blends can comprise about 10%-40% marbits. The RTE cereal pieces to which the marbits are added are often themselves sugar coated to provide not only desirable sweetness but also to enhance their crunchy texture. Since marbits can contain 90% or more sugar, the combined RTE cereal blend can be quite high in sugar content. Some parents believe that consumption of high sugar RTE cereals by their children is undesirable. Such concerned parents desire RTE cereals that not only their children enjoy but also those that are lower in sugar content. Thus, it would be desirable to provide a reduced sugar dried grained aerated confection suitable for addition as a component to an RTE cereal.

While multicolored and appearance changing marshmallow pieces have enhanced consumer appeal particularly for children's products, such products are perceived to be undesirable by some from a nutritional standpoint due to their high levels of sugar(s). Accordingly, there is a continuing need for new confection products having additional novel aspects beyond appearance and nutrition supplementation; namely, marshmallow and dried aerated confections characterized in part by reduced sugar levels.

However, numerous problems are encountered in attempting to make a reduced sugar dried grained aerated confection. As described above, marbits may comprise 90% or more sugar. Even modest reductions in sugar content are challenging because sugar is an integral part of the substance and structure of marbits. In order to successfully remove sugar from marbits, one or more ingredients must be added in substitution of the removed sugar. Part of the appeal of marbits is the crisp frangible texture described above, a texture directly attributable to the sugar marbits contain.

One approach is to provide a reduced calorie bulking agent such as polydextrose or sugar alcohols. While useful, polydextrose and sugar alcohols are several times more expensive than sugar and some materials can have an undesirable laxative effect especially in more sensitive individuals such as children.

In other approaches, various fiber non-caloric ingredients can be added to the sugar syrup in partial replacement for sugar(s). However, the organoleptic properties of the finished confection are highly dependent upon the sugar content and its crystallinity limiting the flexibility of any sugar replacement.

Surprisingly, the above needs can be met and improved sugar reduced dried grained aerated confections provided. The present improved aerated confections contain high levels of non-hydrated starch that remains in particulate form homogeneously distributed throughout at least one portion or phase of the marshmallow. Inclusion of a non-hydrated starch is obtained by adding the starch material to a concentrated syrup before aeration. The concentrated syrup is low in moisture and thus constitutes a water sparing environment. Surprisingly, addition of a starch ingredient to moisture-sparse syrup can be accomplished without resulting in hydration of the starch. The starch acts as an inert filler with minimal adverse impact on the desirable marshmallow properties provided by an aerated syrup. As a result, such starch addition can be used to provide a 1:1 substitution for sugar or other syrup ingredients with minimal adverse organoleptic effects.

The present invention additionally provides methods of preparing such reduced sugar dried aerated confections. In one variation, the reduced sugar dried aerated confections are colored and flavored. A combination of two or more colors or flavors may be blended into a single grained confectionary piece or it can contain separately colored and flavored regions. In another variation, composite reduced sugar dried aerated confections are prepared comprising either a protein containing or hypoallergenic non-protein containing quickly dissolving confection portion and a slowly dissolving confection portion. Such confections can be prepared by substituting the present marshmallow compositions for those of the '216 patent's methods and those described herein. In still another variation, reduced sugar dried aerated confections can be fortified with nutritional components in the manner described in '460 and '953.

BRIEF SUMMARY OF THE INVENTION

In its product aspect, the present invention resides in reduced sugar aerated confectionery compositions. In dried form, the present products are especially suitable for admixture with an RTE cereal base. The reduced sugar aerated confectionery compositions comprise:

A first continuous heterogeneous phase including a structured amorphous material;
wherein the heterogeneous continuous phase includes about 40%-85% of a soluble saccharide, soluble fiber or polyol component or mixtures thereof (dry weight basis) to form the syrup; wherein the first heterogeneous continuous phase includes a multiplicity of sugar crystals distributed evenly throughout about 1%-35% by weight (dry basis) of a nonhydrated polysaccharide filler ingredient in the form of discrete particles evenly distributed throughout the continuous phase having a mean particle size distribution of 150 microns or less; and,
A second discontinuous phase including a multiplicity of gas cells;
wherein the total sugar content of the composition ranges from 40%-85% by weight (dry basis);
wherein the composition includes about 1%-10% by weight (dry basis) of a structuring component;
A moisture content of about 1%-30%; and
having a density of 0.1-1 g/cc, and,
about 1%-35% of a nonhydrated starch component.
Both soft higher moisture marshmallows as well as crunchy dried confections are contemplated herein.
The products are additionally characterized by a size count of 1-6/g.

In its principle method aspect, the present invention provides methods of preparing such reduced sugar confection compositions. The composition methods of preparation comprise the steps of:

A. providing a cooled concentrated sugar or saccharide syrup about 40%-85% of sugar components and having 25% or less crystallinity and 15% or less moisture;
B. admixing the filler starch to the cooled concentrated syrup to form a slurry;
C. admixing about 1%-10% of a hydrated structuring and/or foaming ingredient to the slurry;
D. aerating the slurry to form a foam;
E. forming the foam into individual pieces; and
F. (optionally) drying the individual pieces to a desired moisture content.

DESCRIPTION OF THE DRAWINGS

FIG. 3 is a process flow diagram of one embodiment of the present methods of preparation.

DETAILED DESCRIPTION OF THE INVENTION

The present invention provides sugar reduced aerated confectionery compositions and dried products prepared therefrom and to methods for preparing such aerated confectionery products. Each of the product ingredients and product features and steps of the present methods are described in detail below.

Throughout the specification and claims, percentages are by weight (dry weight basis) unless otherwise indicated and temperatures in degrees Centigrade unless otherwise indicated. Each of the referenced patents or patent application are incorporated herein by reference.

The present invention provides sugar reduced improved aerated confectionery products that mimic their full sugar containing aerated confectionary counterpart products in taste, appearance, bowl life and texture. The present confectionery products find particular suitability for use as added components to children's ready-to-eat breakfast cereals or as ingredients to shelf stable food products such as granola bars or additives to such products as hot cocoa mixes.

Traditional marbit products generally comprise about 90% or more sugar. By "sugar" as meant herein are common nutritive saccharidic sweetening agents and include not only disaccharides such as sucrose but also monosaccharides as glucose, dextrose and fructose as well as oligosaccharides found in corn syrup, corn syrup solids, and maltodextrin. "Oligosaccharides" as used herein describes a molecule containing two to twenty sugar units joined by glycosidic bonds. The soluble fiber, inulin, is an example of an oligosaccharide discussed herein.

"Sugar reduced" as used herein is meant that the aerated confectionary products contain less than 90% sugar, preferably between 50%-90% sugar and most preferably between 70%-80% sugar. Such saccharide components can include any nutritive carbohydrate sweetening ingredients. In some low sugar marbits, some of this soluble saccharide component used in the syrup can also be replaced with other soluble ingredients like soluble fibers, such as polydextrose or inulin, or polyols such as maltitol, sorbitol or glycerol.

As used herein "crystallinity" generally refers to the crystal content of finished confections. The crystals are typically sucrose crystals, but can be the crystalline form of any nutritive carbohydrate sweetener used to create the starting slurry. An indication of the degree of crystallinity of the starting slurry is cloudiness. After dissolving the starting materials the hot slurry is typically clear, as the slurry cools crystallinity increases and the slurry appears cloudy. Finished aerated confections containing nonhydrated starch can have a cystallinity range of 0%-30%, with the best range of crystallinity occurring between 15%-30%, with a preferred range of 22%-28% crystallinity.

By "aerated confection product" is meant an aerated solid confectionery food product in solid form having an air or gas phase and having a density in the range of about 0.10 to about 1 g/cc.

Figure 1:
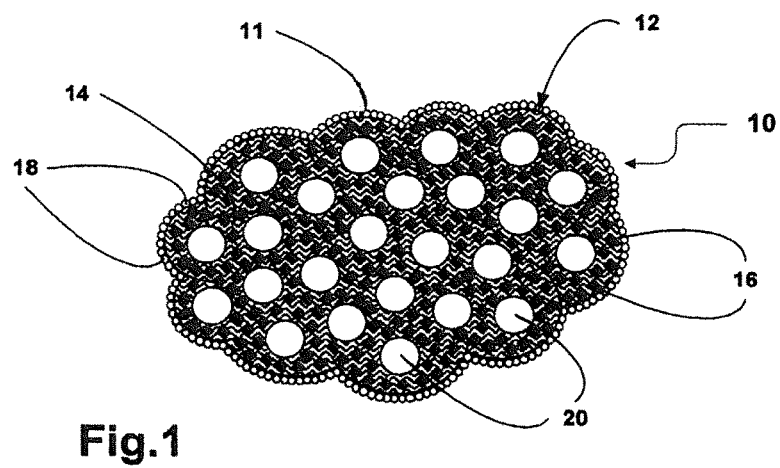
FIG. 1 is a greatly enlarged cross sectional representation of aerated confections of the prior art.

Referring now to FIG. 1, there is depicted a greatly enlarged cross-sectional representational view of one piece fabricated from aerated confection compositions of the prior art generally designated by reference numeral 10. Prior art piece 10 can be seen to have an outer surface or periphery 11 as depicted in FIG. 1 and is fabricated from a composition 12 in the form of foam having a first heterogeneous continuous phase 14 of a structured amorphous sugar syrup made from saccharides, soluble fiber or polyols or combinations thereof. Commonly, the amorphous sugar phase 14 includes gelatin as a structuring ingredient that reinforces the amorphous phase and imparts distinctive organoleptic attributes. It can be further seen that the heterogeneous continuous phase is a seeded or grained confection composition that also includes a multiplicity of sucrose crystals 16 (indicated by black diamonds) or other crystalline materials 16 randomly and generally evenly distributed throughout the amorphous sugar phase. FIG. 1 further depicts that piece 10 and composition 12 additionally can include topical dusting or enrobing starch particles 18 (indicated by smaller white circles) located principally proximate the outer surface or periphery 11. It can be seen that in prior art compositions that the dusting starch 18 is not uniformly distributed throughout the composition but rather confined to the surface. FIG. 1 further depicts that composition 12 and piece 10 fabricated therefrom additionally includes a second discontinuous gas or air phase in the form of a great multiplicity of bubbles or gas cells 20 (indicated by larger white circles).

Figure 2:
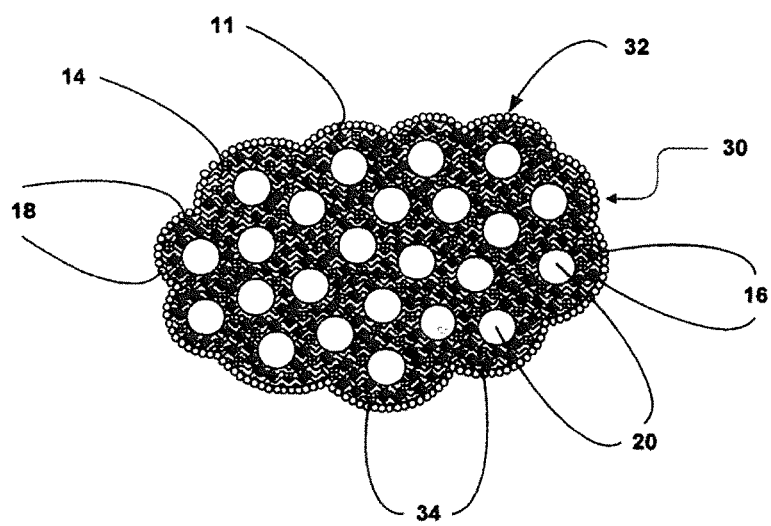
FIG. 2 is a greatly enlarged cross sectional representational view of aerated confections of the present invention.

Referring now to FIG. 2, there is similarly depicted a piece 30 of the present invention fabricated from a reduced sugar formulation or composition 32 of the present invention. Reduced sugar formulation 32 and piece 30 fabricated therefrom can be seen to include similar elements such as periphery 11, continuous amorphous sugar phase 14, sugar crystals 16 dispersed therethrough, air cells 20 and even topical dusting starch particles 18. However, and importantly herein, there can also be seen that the continuous amorphous phase 14, and thus formulation 32 and piece 30 fabricated therefrom, additionally essentially includes a filler non sugar polysaccharide ingredient 34 such as a starch (indicated by white squares with a cross therein). Unlike dusting starch 18, filler starch ingredient 34 is seen to be evenly distributed throughout amorphous continuous phase 14. Filler starch 34 can also be seen to partially replace a portion of sugar crystals 16 as well as the amorphous continuum. Filler starch 34 is further seen to be in the form of discrete particles rather than as uniformly blended into the amorphous continuous sugar phase 14.

From an ingredient standpoint (as compared to the above physical or structural standpoint), the present sugar reduced aerated confectionery compositions 32 essentially comprise 1) a syrup component formulated from one or more sugars, soluble fibers, or polyols, 2) a structuring component, 3) a nonhydrated or filler polysaccharide ingredient such as a starch, and 4) about 1%-30% residual moisture. Optional ingredients include a whipping agent(s), a foaming agent(s), color and flavor ingredients(s), and supplemental nutritional ingredients. As noted above, the present compositions are aerated and in the form of a foam and thus include a gas phase.

The reduced sugar aerated confectionery composition products are fabricated from compositions that essentially comprise about 40%-85% of saccharides, soluble fibers or polyols as the principle ingredients, about 1%-10% of a structuring component, and about 1%-35% of a nonhydrated starch polysaccharide component in particulate form.

Reduced sugar aerated confections contain a saccharide component of at least one nutritive carbohydrate sweetening ingredient. Nutritive carbohydrate sweetening ingredients include those such as monosaccharides such as dextrose (e.g., anhydrous, monohydrate or dextrose syrup) fructose, tagatose, mannose, and galactose, and disaccharide sugars such as sucrose, maltose, trehalose, and lactose, as well as hydrolyzed starch syrups such as corn syrup which include dextrin, maltose and dextrose, invert sugar syrups which include levulose and dextrose and/or converted fructose or glucose syrups. The saccharide component as described herein is most commonly provided by such nutritive carbohydrate sweetening ingredients as extra fine ground sugar (sucrose), dextrose and corn syrup. In other variations however, all or a portion of the saccharide component can be supplied by impure or flavored saccharidic ingredients such as fruit juices, purees, honey nectars, concentrated fruit juices, fruit flavors and mixtures thereof.

The saccharide component can also optionally include a non-filler polysaccharide component or portion such as about 1%-15% cornstarch as a hydrated dispersed syrup starch and/or as a dusting or, equivalently, an enrobing starch. For example, in prior art aerated confection formulations, a sugar syrup is prepared to include about 0.1%-5% of a starch ingredient. When the syrup is boiled (i.e., heated to above the gelatinization temperature of the starch in a high moisture solution), some of the starch will gelatinize or cook thereby thickening the syrup, i.e., will become hydrated. The hydrated starch loses its particle identity and becomes dispersed within and part of the amorphous saccharide phase. Cornstarch, topically added as a "dusting starch" to control stickiness, can be applied at 1%-10%. Some quantity of cornstarch is incorporated into the surface of the marbit as a consequence of this usage of cornstarch.

Filled starches as used herein refer to starch blended with other ingredients such as fiber, nutritive carbohydrate sweetening ingredients or high potency sweeteners. For example, minor amounts of a high potency sweetener ingredient may be added to the dusting starch to increase the overall sweetness profile of reduced sugar marbits. In preferred embodiments, the saccharides of choice are sucrose, dextrose, and corn syrup.

The sugar reduced confections essentially further include about 1%-10%, preferably ≈1%-6%, and most preferably, ≈2% of a foam structuring or gelling component. Suitable structuring components include gelatin; hydrophilic colloids such as pectin; hydrated modified starches; gums such as guar, agar and carrageenan; and, mixtures thereof. For products to be marketed in North America, the preferred structuring agent is gelatin. The gelatin can be derived from bovine, porcine, or piscine (fish) sources or can be of mixtures thereof. Preferred for use herein is high Bloom strength gelatin, e.g., 200 Bloom strength or 250 Bloom strength. In another protein free embodiment, the structuring agent is a combination of carrageenan and guar gums.

The present sugar reduced aerated confections also essentially contain 1%-35% of a nonhydrated filler starch component. The skilled artisan will appreciate that this level of filler starch is above and beyond any levels of syrup starch and/or dusting starch employed herein. As a result, the cumulative starch levels can range broadly from about 1%-40% provided at least 1%-35% of the composition is in the form of the present nonhydrated filler starch.

"Nonhydrated starch" as used herein refers to starch that has not either absorbed water or gelatinized or both. Nonhydrated starch acts as an inert filler that replaces sugar, yet provides substance and structure to the finished marbit. The skilled artisan will recognize that the present filler starch can be compositionally similar to syrup starches (i.e., those starches are that are added to the syrup and which are hydrated during the syrup cooking and concentration step) and/or dusting starches. However, importantly herein, the present compositions are defined in important part by additionally describing the location (distributed evenly in the amorphous saccharide phase and in the form of discrete particles) rather than homogeneously dissolved in the sugar syrup.

Suitable nonhydrated starch components can be provided by any convenient material including starches derived from common major cereal grains such as corn (maize), wheat, barley, rice, oats and mixtures thereof. In less preferred embodiments, the starch can be provided by various tuber sources such as tapioca, potato, cassava or from minor cereal grains such as amaranth, triticale and the like are also known and can be used as well as heritage grains. The grain materials can also be supplied in whole or in part by such minor or "heritage" grains such as spelt, kamut, quinoa and mixtures thereof. While not produced in large quantities, such minor and/or heritage grains are especially popular among those interested in organic foods. Of course, both organic and conventional sourced starch materials are contemplated herein. Native corn starch is preferred because of its functionality, price and availability. Nonhydrated starch is significantly different from "dusting starch" as described herein. Nonhydrated starch is incorporated into the aerated confection whereas "dusting starch" is merely topically applied. Addition of nonhydrated starch at the desired concentrations can only be achieved by incorporation; not by mere topical application. Nonhydrated starch is incorporated into the concentrated sugar syrup at levels up to 35% without significantly altering the physical properties of the concentrated slurry. In contrast, if the starch was to be added to the sugar syrup prior to being concentrated, then at least a portion of the starch would hydrate and gelatinize. Even modest hydration and gelatinization of the starch greatly increases the viscosity of the syrup and can even produce an unusable taffy-like consistency. Such a taffy-like material cannot be concentrated or aerated to produce the desired aerated marshmallow compositions herein.

While whole flours and processed flours can be used in substitution for the present preferred starch materials, such use is disfavored since the bran fraction can impart an undesirable speckled appearance to the finished product. Of course, if such an appearance attribute is nonetheless acceptable, e.g., in a highly colored product, such materials can be used in full or partial substitution for the present starch materials. In still other variations, all or a portion of the nonhydrated starch can be substituted by a fiber source, which is substantially insoluble. Fiber materials can include bamboo fiber, cellulose and mixtures thereof. Desirably, such materials are selected from those having a white or at least a light or blonde color. Importantly, such materials are of the selected particle size and appropriate care is to be taken such as taught herein to insure that these materials are added after the syrup is cooled so as to minimize any hydration of the filler ingredients. The fiber filler ingredients will eventually undesirably hydrate and thicken the slurry. Thus, fiber filler bearing sugar slurries have a limited pot-life before they can no longer be successfully aerated.

The filler starch can also be supplied by more costly modified starches or by digestion resistant starches although such materials are less preferred due to their extra expense. However, less costly materials such as maltodextrins can be advantageously used in whole or in part herein as the filler starch ingredient. Maltodextrin will also hydrate with time and so the pot-life for aeration is finite.

The present carbohydrate materials used herein as a food material ingredient are thus to be distinguished from the mineral additives of the prior art such as calcium carbonate used as filler materials or mineral fortification that, while providing mineral fortification, are not calorie food materials per se.

In preferred embodiments, the starch filler material is ground to a particle size sufficiently small to provide a non-gritty texture to the finished product. Good results are obtained when the filler starch has a mean particle size of 150 microns or less (≤150 μm). Better results are obtained when the filler starch or filler material ranges in particle size from about 2-50 microns (μm), preferably about 5-25 μm.

Since the present filler starch will most often be used to reduce the amount of sugars such as sucrose, and dextrose, the finished present confection products can have a reduced sweetness taste compared to comparable products of the prior art with which the customer will be familiar. If desired, the present products can additionally comprise added or supplemental high potency temperature resistant sweeteners or sweetness enhancers to increase the sweet taste to familiar levels. These added high potency sweeteners can be added to the syrup, blended with the present filler starch or other filler carbohydrate ingredient(s), and/or blended with the dusting starch. Sugar reduced aerated confections can comprise an effective amount of a heat tolerant high potency sweetener, particularly in the enrobing or dusting starch. Such high potency sweeteners include potassium acesulfame, sucralose or mixtures thereof. Use of such high potency sweeteners is often desired to enhance product sweetness. Sucralose is preferred for use herein since acesulfame K (colloquially, "Ace K") can impart a bitter taste to some consumers sensitive to potassium. Alitame, neotame, saccharin and cyclamates can also be employed but price, availability, consumer acceptance and governmental regulations all effect their selection for use. Thaumatin can also be used and provides the advantage of flavor masking off flavors. In other variations, the products can employ supplemental "natural" or plant sweeteners such stevioside such as from ground *stevia* leaf, *stevia* extract (an herb, *Stevia rebaudian*, native to Peru and Paraguay) or essence or tincture of *Rubus suavissimus*. Such products are used at amounts effective to provide desired sweetness levels. Other sweetness enhancers and derivatives of that can be used include; glycyrrhizin, neohesperidine dihydrochalcone, mogroside, monellin, mabinlin, pentadin, brazzein, and curculin. Such materials are often blended with or formed into powder form by mixing with a solid substrate or carrier such as a starch or maltodextrin. While not temperature stable per se, the sweeteners can be added at levels that compensate for losses during processing. In preferred embodiments, such materials are added to the cooled syrups so as to minimize any loss due to exposure to elevated temperatures. Generally, such products are used at levels ranging from about 0.001% to about 1% depending upon the sweetening power of the active ingredient and concentration of the active ingredient in the sweetener ingredient. Preferred for use are sucralose, acesulfame, and mixtures thereof since such sweeteners are more tolerant of the manufacturing process than the plant derived sweeteners.

An alternative embodiment of this invention includes "quickly" and "slowly" dissolving reduced sugar aerated confections each created by independent formulations, but often combined in a single marbit piece. By "quickly dissolving" herein is meant that a 0.2 g piece (whether spherical, cylindrical, or cube shaped) dissolves in liquid water or in a dairy beverage such as cold milk at a temperature above freezing up to 65° C. in about 10 to under 120 seconds. Better products dissolve in cold milk (5° C.) in about 20 to 90 seconds. If the sugar reduced confectionery product dissolves too quickly (i.e., in 5 to less than 10 seconds), then the product is "instantly dissolvable". If the reduced confectionery product dissolves more slowly, (i.e., in about greater than 120 seconds), then the product is "slowly dissolvable". Slowly dissolvable products include sugar reduced dried aerated marshmallow compositions that become soft upon extended exposure to cold milk (e.g., over 120 seconds) and dissolve thereafter only very slowly. Both instantly dissolvable and slowly dissolvable products are unsuitable for use herein as the principal essential product component although each component can be used alone or together as an optional additional component or portion.

It will be appreciated that the sugar profiles of such compositions can be similar. However, such alternative quickly dissolving reduced aerated confections substitute other ingredients for the common gelatin whipping/structuring agent to provide such tailored properties and utilize as their whipping agent either a non proteinaceous whipping agent (described herein) or a protein based whipping agent as described in U.S. Pat. No. 6,207,216. The non proteinaceous whipping agent is essential to providing the quick dissolving feature described herein as well as to provide a hypoallergenic version of the reduced quickly dissolving confection compositions. Suitable non proteinaceous whipping agents are selected from the group consisting of sodium lauryl sulfate ("SLS"), sodium steroyl lactylate ("SSL"), methyl cellulose ("MC"), hydroxypropyl methyl cellulose ("HPMC"), and mixtures thereof. Both SSL and SLS are well known food surfactants. Both methyl cellulose and hydroxypropyl of various types and grades are available from the Dow Chemical Company. While not wishing to be bound to the proposed theory, it is speculated herein that these particular foaming ingredients interfere with the structuring agent in a manner such that within the ranges for whipping ingredients and structuring agents herein, compositions can be provided that exhibit the rapid or quick dissolving feature desired herein.

Generally, in the production of such substituted methyl cellulose ethers, alkali cellulose is reacted with methyl chloride alone or in combination with propylene oxide to add substitute groups. Various specific chemistry groups are labeled as "A", "E", "F", and "K" groups. Also, the initial high molecular weight alkali cellulose can be subjected to controlled degradation to produce various lower molecular weight materials. Generally, as the average molecular weight is reduced, so is the viscosity at standardized concentrations. Thus, the viscosity characterization for a particular grade and chemistry material is related to its average molecular weight. Higher numbers generally indicate higher viscosity, e.g. Methocel A15 will have a higher viscosity than Methocel A3.

Also, generally as greater amounts and/or higher strength structuring agents are employed, the higher viscosity MC and HPMC materials foaming agents become less effective at providing reduced sugar quickly dissolving dried confections and the lower molecular weight or viscosity grades are preferred. Of course, formulating useful reduced sugar quickly dissolving confection compositions requires some balancing of amount and strength of the structuring agent with selection of particular types and concentrations of foaming ingredient.

Useful materials include those grades of methyl cellulose and HPMC that are characterized by a viscosity of 3 to 450 centipoise (cps) across the various chemistries. Such useful materials specifically include, for example, those materials available under the trade designations as Methocel E3, F3, K3, E50, F50, F450, K100, and mixtures thereof. Preferred for use herein are low viscosity or lowest molecular weight varieties across the various substitution chemistries, e.g., characterized by a viscosity value of 3-50 cps and include the specific materials designated as Methocel grades E3, F3, K3, E50, F450, K100 and mixtures thereof. Most preferred for use herein for the hydroxypropyl methyl cellulose is that available under the trade name Methocel E3. Preferred for use herein is a combination of about 0.5% Methocel E3 with about 0.05% SLS especially when used in combination with gelatin as the structuring ingredient.

The skilled artisan will appreciate that these particular foaming agents are to be distinguished from other gum or thickening ingredients such as microcrystalline cellulose or carboxymethylcellulose.

The sugar reduced food product compositions and products prepared therefrom can further comprise a wide variety of supplemental materials to improve the organoleptic, visual, and/or nutritional properties of the finished confectionery products. Useful materials include, for example, colors, flavors, preservatives, nutritional fortifying ingredients and mixtures thereof. If present, such optional materials can collectively comprise from about 0.01% to about 25% by weight of the present products, preferably about 1%-10% and for best results about 1%-5%.

More preferably, any insoluble component such as mineral fortifying ingredient (e.g. calcium carbonate or a calcium phosphate salt for calcium fortification) is added in the form of a fine powder having a particle size such that 90% has a particle size of less than 150 micron, preferably 100 μm or less in size and for best results under 10 microns. Insoluble components such as minerals are not susceptible to the various heat and moisture levels created during the manufacture of sugar reduced aerated confections and therefore do not require the same selective addition as the nonhydrated starch taught herein. In addition to providing calcium nutrition, addition of such calcium or other minerals modestly reduces the caloric value of the finished products that include such minor ingredients.

In highly preferred embodiments, the sugar reduced aerated grained confectionary products comprise a calcium ingredient of defined particle size in an amount effective to provide the desired calcium enrichment. As established reduced aerated grained confectionary products find particular suitability for use as inclusions to child oriented Ready-to-eat cereal products. Children are in particular need of additional calcium. Good results are obtained when the present reduced aerated confectionery compositions comprise sufficient amounts of calcium ingredients to provide a calcium content of about 50-2000 mg per serving (28.4 g (1 oz) dry basis) (i.e., about 0.15%-10% by weight, dry basis) of calcium, preferably about 100-1500 mg Ca per serving, and more preferably about 200-1000 mg calcium/serving. Additionally, such nutritionally fortified products being sweet, being both quickly dissolving and crunchy are also well received by the elderly especially the very aged who need special nutritional care and who can be fussy about food.

Useful herein to supply the desired calcium levels are calcium ingredients that supply at least 20% calcium. Preferred for use herein are calcium ingredients selected from the group consisting of food grade calcium carbonate, ground limestone, calcium phosphate salts and mixtures thereof.

In one preferred embodiment, the improved reduced aerated grained confection compositions are fat free, i.e., have fat contents of less than 5%, preferably less than 0.5%.

The sugar reduced aerated grained confectionary compositions can be optionally flavored and/or colored to provide uniform products or products having phases of variously colored and flavored portions. By "color" is meant a confection of any color, including white, which may be provided by the base confection ingredients, and by additional artificial or natural coloring agents. "Color" also includes various hues or shades, e.g., pink and red.

While the present invention contemplates soft or compressible or higher moisture marshmallow products, the present invention finds particular suitability for use to provide sugar reduced aerated grained confectionary compositions that are preferably dried to form dried frangible non-compressible shelf stable compositions having a reduced or residual moisture content ranging from about 1%-6%, preferably about 1%-3% and most preferably about 1%-2.5%.

The reduced confections' compositions have densities of 0.10-1.0 g/cc, preferably about 0.1-0.4 g/cc and most preferably about 0.15-0.3 g/cc. Preferred products have a density of about 0.1-0.4 g/cc at moisture contents of 1%-6%, preferably 2%-5%.

The present improved sugar reduced aerated grained confectionery compositions can be formed into products such as suitably shaped and sized pieces. In preferred embodiments, the pieces have a size count ranging from about 0.2-6/g, preferably about 1-6/g, and most preferably about 3-6/g. Thus, pieces can range from about 0.15-5 g each. As a result, these pieces generally have a bulk density of about 235-340 g per liter. The pieces can be in common geometrical shapes such as disks, spheres, cylinders, cubes, or shaped such as to form three-dimensional shapes. The pieces can also be in the form of wafers (e.g., having a thickness of about 1-30 mm preferably about 2-15 mm) that can have a peripheral outline of a regular shape, e.g., pentagon or animal or can be randomly shaped. In preferred form, wafers can have a cross sectional area ranging from about 15 $mm^2$ to about 900 $mm^2$. Due to their relative thinness, such wafer shaped pieces are sometimes referred to as two dimensional shapes. While particular attention is paid herein to grained or crunchy finished products, the skilled artisan will appreciate that with modest formulation adjustments, particularly to the structuring ingredient, that non-grained, e.g., chewy, embodiments can easily be prepared.

In alternative embodiments, the pieces are in the form of composite pieces that additionally comprise a slowly dissolving aerated confection portion. The slowly dissolving portion is a portion that requires more than 90 seconds to dissolve in cold milk, preferably more slowly than two minutes. The slowly dissolving portion can be fabricated from known aerated confection compositions and techniques including those described in U.S. Pat. No. 6,207,216. Generally, such compositions comprise gelatin as the whipping ingredient as well as the structuring ingredient. Also, such slowly dissolving confection compositions generally do not include non-gelatin proteinaceous whipping or foaming ingredients nor the protein based whipping agents of '216.

The slowly dissolving portion to quickly dissolving portion can range widely from about 1:20 to about 20:1. Each portion(s) can be continuous or discontinuous. For example, one product can comprise both a core portion and also an outer shell portion. In a preferred variation, the reduced sugar quickly dissolving portion comprises the outermost layer or portion with the core fabricated from a sugar reduced slowly dissolving composition. In more preferred embodiments, the sugar reduced quickly dissolving external portion completely surrounds the sugar reduced slowly dissolving portion to form a shell. In a preferred form, the shell is in the form of an egg. Disposed within the egg or eggshell is the more slowly dissolving portion. This slowly dissolving portion can be formed into the shape of a small baby animal such as a duckling, chick, reptile, and dinosaur.

Upon addition to cold milk, the egg portion quickly dissolves to reveal the contained shaped baby portion.

In another variation, the pieces can be fabricated in the form of shaped wafers, e.g., having an outline in the form of a familiar object. Such familiar objects can include a hat, star, moon, clover, diamond or heart. An example of a hat shape used to create a two component confection is well known and described in U.S. design Pat. No. 376,039 (issued Dec. 3, 1996). Such designs include an outer or peripheral layer fabricated from a slowly dissolving aerated confection composition framing an inner quickly dissolving core. The core by definition is typically smaller and centered within the larger design and may have a similar or very dissimilar shape. Upon addition to milk, the quickly dissolving core portion "melts" away to reveal a shaped aperture. It would therefore be possible to have a sugar reduced hat shaped aerated confection reveal a shamrock shaped aperture upon addition to cold milk. In other variations, the slowly and quickly dissolving sugar reduced aerated confections can be reversed so that a hat shaped wafer dissolves quickly away to form a residual shamrock shaped wafer piece. In still other variations either portion can be discontinuous. For example, a clown face shaped piece with blue eyes, a red nose and a yellow mouth can be formed each from a sugar reduced quickly dissolving portion that can each dissolve at the same or different rates but at a faster rate than the face portion.

While soft higher moisture variations require packaging in food packaging having moisture barrier properties and enjoy only limited shelf life, dried embodiments (i.e., having a moisture content of about 2%-5%) enjoy extended room temperature shelf life.

The present marshmallow filler starch containing dried product embodiments have similar break strength when compared to otherwise similar full sugar equivalents. Desirably, having a similar strength can lead to no more abrasive loss during production handling of the finished dried product than would be expected of similar full sugar equivalents.

Additionally, these products are similar in hygroscopicity as their full sugar equivalents. Also, the filler starch bearing products surprisingly exhibit comparable crunch and chew properties notwithstanding the difference in sugar content. Importantly, their bowl life in milk (as a component of a RTE cereal blend) is also comparable to full sugar counterparts.

Method of Preparation

The invention further provides novel methods for making the above described reduced aerated confections and products. The present methods essentially includes the steps of:
A. providing a cooled concentrated sugar or saccharide syrup having 40% or less crystallinity and 15% or less moisture;
B. admixing the filler starch to the cooled concentrated syrup to form a slurry;
C. admixing a hydrated structuring and/or foaming ingredient to the slurry;
D. aerating the slurry to form a foam;
E. forming the foam into individual pieces; and
F. (optionally) drying the individual pieces to a desired moisture content.

Referring now to FIG. 3, there is shown a flow diagram of one preferred embodiment of the present invention's method of preparation generally referred to by reference number 100. In one embodiment, the present methods include a step A of providing the cooled concentrated sugar syrup 110. Step A can include one or more sub-steps including a sub-step 112 of syrup mixing or dissolving or admixing the nutritive carbohydrate sweetener component(s) and water to form an initial or make-up syrup. Optionally, as described above, the make-up syrup can additionally include about 0%-5%, preferably about 0%-4% of a starch ingredient. The make-up syrup can have an initial moisture content ranging preferably about 15%-35%, preferably about 18-25%. Step A can include a further sub-step of boiling or concentrating the make-up syrup mixture 114 to form a concentrated hot sugar syrup 115 having a moisture ranging from about 10%-15% and about 0% crystallinity. Step A can further include the sub-step of cooling 116 the hot concentrated syrup 115 to form a cooled concentrated syrup 117. The methods 100 can further optionally include a step 118 of seeding the cooled concentrated slurry 117 with crystalline sucrose to improve the manufacturing process to provide a cooled concentrated syrup 119 having preferably about 10%-25% crystallinity and a moisture content of about 10%-15%.

In other embodiments, the step A of syrup preparation can be practiced in a single unit operation such as when practiced employing a cooker extruder such as a twin screw extruder. In still other variations, one or more sub-steps can be practiced using single pieces of equipment.

In preferred variations, an initial make-up or starting syrup is prepared having a moisture content of about greater than about 15%-25% and about 0%-20% crystallinity. This initial or start-up sugar syrup can then be heated to about 235-255° F. (~112-124° C.), preferably about 245-255° F. (~112-124° C.) and for best results about 250° F. (~121° C.) with moisture removal (such as by boiling in an open atmosphere vessel or in a evaporator) to provide a hot concentrated syrup having a moisture content of about 8%-15%. The hot concentrated syrup is preferably clear, i.e., having 0% crystallinity. Thereafter, the hot concentrated sugar syrup can be cooled to about 170 to 220° F. (~77°-104° C.) to form the cooled concentrated sugar syrup of a desired crystallinity value.

The cooled syrup can optionally be seeded with (~1% crystalline material to form the seeded cooled syrup 119. Seeding is typically employed to accelerate the formation of crystals in the cooled syrup. Whether or not seeding is employed, good results are obtained when the cooled syrup has a crystallinity content of about 10%-20% cyrstallinity.

The methods can further include a principle step B of admixing 120 a nonhydrated starch as a filler to the cooled concentrated syrup to form a cooled sugar/starch slurry 122. Generally, the filler starch is at ambient temperature. Due to the water starved environment, the added filler ingredient remains in a nonhydrated particulate form only modestly increasing the viscosity of the sugar slurry so formed. Adding the relatively cooler filler starch to the cooled (but still warm) concentrated syrup generally results in further temperature reduction of the blended slurry. Regardless of technique, the slurry 122 is cooled to form a cooled filler starch bearing slurry with a temperature suitable for addition of a foam structuring agent such as gelatin at about 150-180° F. (71-82° C.). When subjected to higher temperatures in a sugar syrup, gelatin can exhibit degradation and loss of its foam structuring properties. Still another problem is that gelatin, in the presence of reducing sugars can produce undesirable Maillard reaction browning especially at elevated temperatures.

The present methods can include a step C of admixing 130 a hydrated structuring and/or foaming ingredient 132 to the cooled sugar/starch, i.e., filler ingredient bearing, slurry 122 to form an aeratable cooled filler starch bearing sugar syrup 134. In preferred form, hydrated gelatin 132 is added that functions both as a foaming agent but also as a structuring agent in the finished product. Conveniently, the admixing step 130 can be practiced using an in-line static mixer.

Suitable for use herein as the foam structuring agent or gelling component is a hydrocolloid ingredient such as pectin, gelatin, modified starches, albumen, gums and mixtures thereof. For products to be marketed in North America, the preferred structuring agent is gelatin especially from bovine and/or porcine sources. The foam structuring agent can be dissolved or dispersed in a suitable carrier, preferably water.

In the preferred form, the gelatin addition is practiced after the filler starch addition 120. While the order of filler starch and gelatin can be reversed or even practiced together, adding the filler starch first facilitates the temperature control of the slurry.

Also, since gelatin degradation is a function of both temperature and time, shortening the duration of the process, particularly the post cooling portion of the process, can allow for less cooling. Of course, if gelatin loss is acceptable, the liquid confection blend to-be formed can be formulated with extra gelatin to compensate for any anticipated gelatin loss through thermal degradation.

Optionally, the present methods 100 can further include a step 140 of adding or admixing other minor ingredients such as color, flavor, normutritive or artificial sweeteners or nutritional fortifying ingredients or combinations thereof can additionally be admixed to the slurry 134. In certain variations, the slurry is sub-divided into two or more portions or sub-streams to which distinctive color and flavor or other ingredients are added. Such a sub-division allows for the preparation of individual pieces of two or more colors from a single uniform sugar syrup batch.

The filler starch containing slurry is then aerated to achieve a foam of desired density and the aerated foam having a crystallinity of about 0%-70% and a moisture content of about 8%-20%.

The present methods 100 additionally include a principle step D 140 of aerating the slurry 140 to provide an aerated soft foam 142. Aeration of the concentrated sugar slurry can be accomplished by any number of means well known to those skilled in the art. As described above, the objective of aeration is to produce a foam with a density of about 0.1-0.35 g/cc at atmospheric pressure. Aeration is accomplished by injecting a gas into the hot concentrated slurry while whipping or other similar agitation of the slurry occurs. Since this is a food product the gas selected should be non-toxic and relatively inert. Suitable gasses include air, nitrogen and carbon dioxide. While air or other inert gasses can be employed, preferred for use herein as the aerating gas is nitrogen.

Equipment useful for aerating sugar reduced confections are well known to persons skilled in the art. A full description of such useful equipment and techniques can be found in U.S. Pat. No. 2,600,569, issued Jun. 17, 1952, incorporated herein by reference. This patent describes the Oakes type continuous marshmallow whipper named after its inventor Earl T. Oakes. Since Oakes type aeration or other mechanical aeration can result in frictional heating of the foam so formed, aeration can be practiced with supplemental cooling before, during and/or immediately after the aeration step for better control of the foam temperature desirably within the range of 20-80° C., preferably about 50-60° C., to provide a warm plastic sugar reduced confectionery foam.

In certain variations, the addition of different colors and flavors to individual portions or sub-streams is practiced by post aeration addition rather than pre-aeration as described above. An advantage of post-aeration division and coloration is that only a single aerator is required. However, pre-aeration sub-division, while requiring multiple aerators also allows for greater control of end product attributes such as the degree of aeration and thus final product density.

Thereafter, the present methods can include a step E of forming 150 the foam into individual pieces 152. Step E can involve one or more sub-steps. For example, the foam while hot 71-82° C. (~160-180° F.) is deformable or plastic and Step E can include a sub-step of extruding the foam mass into one or more foam ropes. If desired, the peripheral shape of the extruded foam rope can be selected to impart a desired peripheral shape to the finished products. For those products intended as dried sugar reduced marshmallows, good results are obtained with rope thickness ranging from about 5-30 mm.

Step E can further include a sub-step (not shown) of applying a light coating of enrobing or dusting starch to either or both the foam extrudate ropes and pieces prior to the drying step to reduce the stickiness of extruded ropes and/or pieces. In one technique, the ropes are applied to a bed of enrobing or dusting starch, typically cornstarch (alone or filled with other ingredients as described herein). Often, additional cornstarch is topically applied to the sticky top surface of the rope. The dusting starch typically adds about 1%-10% of the dusting starch (dry weight basis) to the confection composition typically proximate the outer periphery of the ropes after de-starching. The dusting starch also facilitates sectioning the ropes into individual pieces by reducing the stickiness of the ropes.

The dusted ropes can be cooled to about ambient temperature 21-38° C. (70-100° F.) to allow the foam to set sufficiently for and subsequently being cut into individual pieces of a desired shape and size and dried. Conveniently, the ropes are advanced along a moving belt to allow the structuring agent sufficient time to set to form ropes that can be sectioned into individual pieces without deforming the foam structure of the aerated composition. Good results are obtained when the ropes are allowed to cool for a minimum of 15-120 seconds to form the cooled solid aerated wet foams. Higher foam temperatures during extrusion can require longer cooling or setting times within this minimum range. Of course, once cooled for the minimum times to set the structure of the foam, the ropes can be allowed to cool longer or be held for extended times.

Thereafter, step E can include a sub-step of be cutting or sectioning the cooled structure set ropes to form into individual pieces. The cutting sub-step can be practiced using a reciprocating guillotine knife or other slicer. In a preferred variation, a high speed rotary knife is employed such as is described in U.S. Pat. No. 6,251,203, "Method and Apparatus for Processing Aerated Confectionery Foam Rope" (issued Mar. 6, 2001, to Zietlow et al.). Preferred herein is to form thin wafers ranging from about 1-10 mm in thickness, preferably about 2-5 mm, although thicker products for soft marshmallow products are also contemplated, e.g., 20-40 mm.

Conveniently, the pieces so formed can be scalped (e.g., put through a scalper) to remove extra cornstarch from the pieces to provide de-starched pieces. The extra removed cornstarch can be captured and recirculated.

In the manufacture of traditional soft marshmallow or other soft confections, the products so prepared are finished are ready for conventional packaging for distribution and sale. Such products can have a moisture content ranging from about 10%-25%, preferably about 10%-15%.

However, in the preferred embodiment of preparation of a dried aerated confection such as the marbit, the present methods can additionally comprise a step F of finish drying 160 the individual and de-starched pieces 152 to about 2%-4% moisture. Any suitable drying technique which will remove the moisture content 1%-4% is adequate. In one preferred technique, the marbits are dried at a slower rate using forced hot air convection drying. For example, the pieces can be put on trays, mounted in a frame that holds about 30-40 trays, and rolled into a drying room until adequately dried. The drying room is kept at a temperature of about 82° C. (180° F.). In other implementations, the pieces are transported by a conveyor through a drying room or tunnel until the desired moisture content is reached. Extended forced hot air drying at cooler temperatures in trays can also be employed (for 2-24 hours). In another example, a suitable method is taught in U.S. Pat. No. 4,785,551, entitled "Method of Drying Confection Pieces". The '551 patent teaches a rapid, five minute drying step using a two-step fluidized bed heating step.

The resulting dried pieces can then be consumed as sugar reduced confections or added to conventional or low sugar Ready-to-Eat or breakfast cereals. An advantage is that such confectionery products dissolve in the cold milk with which such RTE cereals are conventionally consumed.

In an alternative method aspect, someone skilled in the art can appreciate that sugar reduced nutritionally fortified grained aerated confections can be created by applying the method taught in '953. The method taught in '953 describes a method of making nutritionally fortified aerated confections where dry particulate forms of nutritional fortifying ingredients are added to a confectionary slurry either alone or in combination with dry sugar crystals prior to aeration.

In yet another alternative method aspect, multi-color reduced sugar aerated confections can be created by applying the method taught in U.S. Pat. No. 6,309,686, Multi-colored Aerated Confectionery Products and Process For Making, issued Oct. 30, 2001. In the '686 patent, multi-colored confections are created by aerating a plurality of separate, individually colored marshmallow slurries just prior to the extrusion step. In the case of the present invention the aforementioned marshmallow slurries would be sugar reduced to create multi-colored versions of the sugar reduced aerated confections taught herein.

In still another alternative method aspect, quickly dissolving reduced sugar aerated confections can be created by applying the method taught in U.S. Pat. No. 6,207,216, Quickly Dissolving Aerated Confection and Method of Preparation, issued Mar. 27, 2001. In '216 composite products are prepared containing a first portion of a quickly dissolving aerated confection composition and a second slowly dissolving aerated confection portion. The method essentially involves combining without intermixing two independently prepared streams, one quickly and one slowly dissolving, and co-extruding the two streams to form a combined extrudate. The combined extrudate having at least two phases, one quickly and one slowly dissolving. In the case of the present invention the aforementioned quickly and slowly dissolving aerated confection compositions would be sugar reduced as taught herein.

A hypoallergenic version of reduced sugar quickly dissolving aerated confections containing nonhydrated starch can also be produced. The method of preparing such hypoallergenic reduced sugar quickly dissolving aerated confections is similar the method of preparing sugar reduced aerated confections containing nonhydrated starch described herein. The important differences begin with Step A of the current method, to make hypoallergenic reduced sugar quickly dissolving aerated confections it is necessary to begin by blending a portion of the nutritive carbohydrate sweetening ingredient in dry form with a non proteinaceous foaming agent to form a dry blend and admixing this dry blend to the water. No additional changes to Step A are required. The next departure from the current method comes in Step C. where gelatin free structuring agents are purposefully selected. One skilled in the art would have little difficulty altering the current method with these changes to create sugar reduced quickly dissolving aerated confections.

Similar to non-hypoallergenic quickly dissolving reduced sugar aerated confections, the hypoallergenic quickly dissolving versions can also additionally include various other ingredients such as vitamins, colors and minerals or other nutritional or even pharmaceutical ingredients. Such ingredients can be added to the dry blend described above. Those additional ingredients selected for addition to hypoallergenic quickly dissolving reduced sugar aerated confections should likewise be selected from those known to be hypoallergenic.

Optionally, the hypoallergenic quickly dissolving reduced sugar methods can also comprise a step of adding sugar crystals to the cooled sugar slurry to form a crystal seeded cooled sugar syrup. Such crystal seeding of the slurry can be practiced for better control of the desired end product properties (and as more fully described in U.S. Pat. No. 6,436,455 noted above and included herein by reference).

Sugar reduced aerated confections, particularly dried marshmallow pieces; find particular suitability for use as an appealing added component of food products to reduce the overall sugar content. For example, the pieces may be admixed with a Ready-To-Eat or breakfast cereal, especially reduced sugar RTE cereals, intended as children's breakfast cereals.

In a preferred embodiment, the finished RTE cereal can comprise about 60%-99% of a conventional or low sugar dried cereal with or without coating (such as biscuits, flakes, puffs, shreds, granola, and mixtures thereof, formed from a cooked cereal grain or dough of oats, wheat, corn, barley, rice or mixtures) and about 1% to about 40% by weight of the present novel sugar reduced dried marshmallow pieces. In still other variations, the present confections can be admixed with regular or reduced sugar versions of instant oatmeal, dry cocoa beverage mix (especially smaller sized pieces), and dry mixes for other products. The reduced sugar confections can also be used in regular or reduced sugar versions of cereal bar products (e.g., granola bars), toppings for reduced sugar ice cream or yoghurt, or on various reduced sugar baked goods. The present compositions can also be used as an ingredient or phase of other composite confections or candy products.

In other variations, the confections provide appealing reduced sugar carriers for various pharmaceuticals whether containing over-the-counter medications or ethical or prescription drugs or, vitamins, minerals, nutraceuticals, micronutrients, macronutrients, phytosterols, dietary supplements, mixtures thereof, and the like. Due to the aerated and frangible texture, the sugar reduced confections are easy to chew, especially the quickly dissolving versions. In preferred embodiments, such materials are likewise added to the cooled sugar syrup before aeration. Addition at this step in the process of preparation minimizes any heat exposure that might degrade the potency or functionality of any such added active ingredient or minimize any unintended reaction or interaction between such components that might lead to undesired organoleptic properties.

Example 1

To compare the methods of the present invention with conventional practice and to demonstrate the importance of the present methods post sugar syrup concentration's addition of added starch, a series of three syrup formulations were prepared having the formulations given in the "Example 1" table below:

EXAMPLE 1 TABLE

| Ingredient | Example 1A wt % | Example 1B wt % | Example 1C wt % |
|---|---|---|---|
| First Stage: Boil to 250° F. | | | |
| Sucrose | 59% | 54% | 54% |
| Dextrose | 13% | 11% | 11% |
| Corn Syrup (42 DE) | 12% | 11% | 11% |
| Calcium Carbonate | 1% | 1% | 1% |
| Starch | | 8% | |
| Water | 15% | 15% | 15% |
| Second Stage | | | |
| Starch | | | 8% |
| Total | 100% | 100% | 100% |
| Bostwick for 20 sec. at 180° F. | 19.5 | 6.0 | 16.5 |
| Third Stage: Hydrate Gelatin | | | |
| Gelatin | 33% | | 33% |
| Water | 67% | | 67% |
| Total | 100% | | 100% |
| Fourth Stage | | | |
| Concentrated Slurry from Stage 2 | 92.5% | | 92.5% |
| Hydrated Gelatin from Stage 3 | 7.0% | | 7.0% |
| Color and Flavor | 0.5% | | 0.5% |
| Total | 100% | | 100% |

Example 1A is a control or full sugar formula. Example 1A is representative of the conventional technique for marshmallow (and dried marshmallow). Comparative Example 1B shows what happens when 8% starch added to the dilute make-up syrup before the cook concentration step. Comparative example 1C is an example using the processing of the present invention at an equivalent 8% level similar in composition to Example 1B but wherein the starch is added after the cooking concentration step.

Processing Procedure for Example 1

First stage ingredients were placed in scraped surface kettle and heated to dissolve the sugars to about 210° F. (99° C.) to form a sugar syrup having a moisture content of about 19%. For Example 1B this includes the starch, but does not include starch for Example 1C. The three slurry mixtures were then each individually boiled to concentrate solids to 250° F. (121° C.) to achieve a hot concentrated sugar syrup having a moisture content of about 11%. The three concentrated slurries were then cooled to 190° F. (87.8° C.). Then the second stage ingredient (starch for Example 1C) was added to the kettle, while scraping and mixing continued.

All slurries were then cooled to 180° F. (82.2° C.) and then a 20 second Bostwick viscosity measurement test was performed. For the high sugar Example 1A, a 20 second Bostwick value was measured at 19.5 cm. For Example 1B where starch was added to the cook, the 20 second Bostwick was measured at only 6.0 cm indicating a much higher viscosity. For Example 1C of the present invention (where the starch was added after the cooing concentration step was performed), the 20 sec. Bostwick viscosity measurement was 16.5 cm.

The results of this experiment indicate that the high viscosity of Example 1B indicated by the low Bostwick viscosity measurement of only 6 cm prohibited further processing and no finished product could be made. For Example 1A and 1C, gelatin hydrated in water, flavor and color were added to kettle. The slurry and gelatin mixture were then aerated, extruded onto a bed of starch, cut, and then dried to form finished dried marshmallow products.

The results were unexpected since the formulations of Example 1B and 1C are the same differing only in method of preparation and in particular the stage of starch addition. Notwithstanding the same formulation, the Example 1C formulation is highly suitable for use having an acceptably low viscosity while Example 1B is unsuitable for use due to an unacceptably high viscosity.

Next in Step Three for Examples 1A and 1C, water is heated to 180° F. and gelatin is added and stirred until hydrated. In Step Four, the hydrated gelatin from Step Three, flavor and color were added to concentrated slurry in the kettle of Step Two. At this point the moisture content is about 15%. This slurry and gelatin mixture is then aerated, extruded onto a bed of starch, cut, and then dried if desired.

The finished marshmallow products of Example 1A and 1C had substantially similar physical and organoleptic attributes notwithstanding that the products of Example 1C contained 8% more starch than Example 1A.

The Bostwick Consistometer (developed by E. P Bostwick of the US Depart. of Agriculture in 1938 and available from the CSC Scientific Company, Inc) is still the preferred choice for measuring consistency, flow rate and viscosity in a variety of food products. The Bostwick Consistometer is a simple a empirical measuring device. This simple method consists of measuring the distance of flow of a specified volume of product during a specified time the Bostwick is typically used to perform a simple empirical viscosity measurement on any viscous material such as sauces, salad dressings, paints, chemicals or cosmetics at to measure the distance a material flows in a given time interval. Bostwick consistometers have long been used in the food industry for viscosity measurement by timed flow (See, for example, U.S. Pat. No. 3,767,830; U.S. Pat. No. 4,232,049 or U.S. Pat. No. 4,230,053) as well as in the paint, cosmetics, and chemical products industries.

Methods of preparation were practiced and products of the present invention were obtained when, in the above example, the starch level was about 20% starch added to the cooled concentrated syrup.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An aerated confection in the form of a foam, comprising:
  a heterogeneous continuous phase including a structured amorphous material;

wherein the heterogeneous continuous phase include about 40%-85% of saccharides, soluble fibers or polyols;

wherein the heterogeneous continuous phase includes a multiplicity of crystals distributed evenly throughout;

wherein the heterogeneous continuous phase includes 8%-35% by weight (dry weight basis) of an inert nonhydrated polysaccharide filler ingredient in the form of discrete particles evenly distributed throughout the heterogeneous continuous phase and having a mean particle size distribution of less than 150 microns, wherein the filler ingredient is a non-modified starch; and, wherein the structured amorphous material includes about 0.1%-10% of a structuring component;

a discontinuous phase in the form of a multiplicity of gas cells having a density of 0.1 to 1 g/cc; and a moisture content of 1%-30%.

2. The aerated confection of claim 1 wherein at least a portion of the filler ingredient is a starch.

3. The aerated confection of claim 2 wherein the total starch content of the aerated confection is up to about 45%.

4. The aerated confection of claim 3, wherein the foam has an exterior surface and wherein at least a portion of the total starch content of the aerated confection additionally includes an enrobing starch proximate the exterior surface.

5. The aerated confection of claim 4 wherein the structured amorphous material additionally includes about 0.1%-4% of a hydrated dispersed slurry starch.

6. The aerated confection of claim 4 wherein at least a portion of the filler ingredient is a cornstarch.

7. The aerated confection of claim 4 having a fat content of less than 5% and a density of about 0.1-0.2 g/cc.

8. The aerated confection of claim 1 wherein the heterogeneous continuous phase includes 26%-35% by weight (dry weight basis) filler ingredient.

9. The aerated confection of claim 1 wherein the aerated confection further includes 0.01% to about 25% by weight of one or more nutritionally fortifying ingredients.

10. The aerated confection of claim 1 wherein the aerated confection in the form of a foam having a crystallinity of 30-70%.

11. The aerated confection of claim 1 wherein the inert nonhydrated polysaccharide filler ingredient is a partial replacement for saccharides in the heterogeneous continuous phase.

12. The aerated confection of claim 1 wherein the inert nonhydrated polysaccharide filler ingredient is distinct from the structuring component.

13. An aerated confection in the form of a foam, comprising:

a heterogeneous continuous phase including a structured amorphous material;

wherein the heterogeneous continuous phase include about 40%-85% of saccharides, soluble fibers or polyols;

wherein the heterogeneous continuous phase includes a multiplicity of crystals distributed evenly throughout;

wherein the heterogeneous continuous phase includes about 1%-35% by weight (dry weight basis) of an inert nonhydrated polysaccharide filler ingredient in the form of discrete particles evenly distributed throughout the heterogeneous continuous phase and having a mean particle size distribution of less than 150 microns, wherein the filler ingredient is a non-modified starch and least a portion of the filler ingredient is a cornstarch and at least a portion of the cornstarch filler ingredient is ungelatinized and has a mean particle size of 25 μm or less;

wherein the structured amorphous material includes about 0.1%-10% of a structuring component;

a discontinuous phase in the form of a multiplicity of gas cells having a density of 0.1 to 1 g/cc; and a moisture content of 1%-30%; and wherein the foam has an exterior surface and wherein at least a portion of the total starch content of the aerated confection additionally includes an enrobing starch proximate the exterior surface and the total starch content of the aerated confection is up to about 45%.

14. The aerated confection of claim 13 wherein at least a portion of the filler ingredient is an insoluble fiber having a mean particle size of 50 microns or less.

* * * * *